Feb. 20, 1940.  W. P. HERMAN  2,191,386
FEMALE CONTACT PLUG
Filed March 7, 1939  2 Sheets-Sheet 1

INVENTOR
William P. Herman
BY Nathaniel Frucht
ATTORNEY

Feb. 20, 1940. W. P. HERMAN 2,191,386
FEMALE CONTACT PLUG
Filed March 7, 1939 2 Sheets-Sheet 2

INVENTOR
William P. Herman
BY Nathaniel Frucht
ATTORNEY

Patented Feb. 20, 1940

2,191,386

UNITED STATES PATENT OFFICE 2,191,386

FEMALE CONTACT PLUG

William P. Herman, Providence, R. I.

Application March 7, 1939, Serial No. 260,284

5 Claims. (Cl. 173—332)

My present invention relates to the manufacture of electrical contact plugs, and has particular reference to a novel construction of female type plug and a novel method of assembly of the same.

The principal object of my invention is to provide a female contact plug in which the exterior of the plug body is made of a hollow, integral, one-piece body of resilient material such as soft rubber.

It is an additional object of my invention to provide a female plug in which the contact blade and cord lead wire are anchored without the use of screws, bolts, or other outside anchoring means; these being eliminated by the use of an auxiliary inner section.

A further object of my invention is to provide a female plug in which the cord lead wire construction will withstand the bending, twisting, pulling, and other abuse to which the plug is put without danger of short-circuiting or breaking of the cord lead connection. The use of a resilient material such as soft rubber will render the plug body itself unbreakable so that it will not fracture, shatter, separate, or come apart in use, and cause short-circuiting.

Another object of my invention is to provide a female plug of the type above specified which can be made in miniature form for use on electrical appliances such as electric razors and the like, using protruding pin receptacles.

Another object of my invention is to provide a member which will facilitate the securing of the cord lead wire to the contact blade, which is easy and economical to practice and which will facilitate the assembly of the final plug.

A further object of my invention is to provide a construction which relieves the strain on the cord lead connection in accordance with the requirements of the Underwriter's Laboratories.

With the above and other objects and advantageous features in view, my invention consists of a novel arrangement of parts and a novel method of manufacture and assembly, more fully disclosed in the detailed description following, in conjunction with the accompanying drawings, and more specifically defined in the claims appended thereto.

Figure 1:
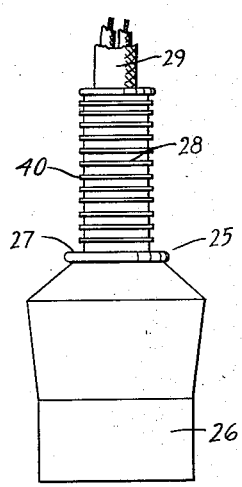
Fig. 1 is a plan view of a female plug embodying my invention completely assembled.

Electrical appliances such as washing machines, drink mixers, percolators, toasters, electric razors, fractional H. P. motors, adding machines, and the like, are normally provided with spaced protruding contact pins and it is necessary to provide a cord lead wire with a female type of contact plug having imbedded therein two contact blades in flat or tubular form which will slip over the protruding contact pins on the appliance. The conventional type of female contact plug is made of a hard rubber or plastic in a cold mold in two complementary sections. The contact blades are set therein loosely and the cord lead wires are attached to the ends of the contact blade by means of screws and the like. The two sections are then held together by means of nuts and bolts or outside clamping devices. It has been found that this type of contact plug has a tendency to wear the cord lead wire, causing it to disconnect or short-circuit, it has a tendency to separate when the screws therein fall out and are lost, and the contact prongs have a tendency to twist about and cause short-circuiting. Furthermore, the use of outside clamps, springs, and nuts and bolts is a constant source of danger to the person handling the contact plug from leakage of current and short-circuiting.

The female plug of the present invention is designed to eliminate most of the trouble normally experienced with this type of contact plug. To this end, I have devised a contact plug which can be readily molded of resilient rubber so that it will not chip or break and will be pliable when used and which can be made of one integral piece requiring no breaking or clamping to hold together other than the distortion of the body itself. The cord lead wire and contact blade can be assembled externally and firmly held in a separate section within the main plug body by the inherent resiliency and distortion of the plug body. The exterior of the plug body is made in one piece and therefore there is no danger of its coming apart in use, nor is there any external metal clamping or screwing parts which can possibly cause short-circuiting or can possibly give the user an electric shock. The plug hereinafter to be described is especially adaptable for use on electrical appliances such as washing machines, mixing machines, percolators, and electric razors and electric clippers, and the like, for the small size of the plug makes it difficult to use nuts and bolts or other types of conducting and clamping means.

Referring to the drawings illustrating my invention, the female plug 25 comprises a main body portion 26 of one piece material and preferably made of resilient soft rubber. Although the resiliency of the rubber may be varied to suit different requirements, I prefer to use a resilient soft rubber having a durometer reading of between 60 to 65 as the most ideal resiliency for this purpose. The main body portion 26 is provided with an upper central cable opening 27. Extending from the cable opening 27 is an elongated cable gripping portion 28 surrounding the cable bearing the electrical cord lead wire connection 29. The elongated portion 28 may be provided, if desired, with transverse ribs 40 to protect it against rubbing, twisting, and other hard wear and to provide sufficient resiliency so that if bent sharply, it will return to its upright position.

Figure 3:
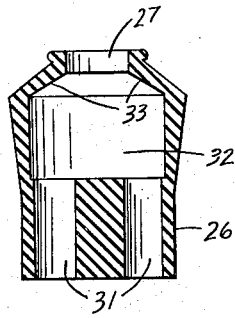
Fig. 3 is a sectional view of the main plug body.

Referring to Fig. 3, the lower half of the main body portion 26 is substantially rectangular in shape and is provided with spaced parallel slots 31 preferably circular in cross section. The slots 31 open into the upper half of the body portion 26 into a chamber 32, the upper portion of which tapers towards the cable opening 27 to form inclined shoulders 33.

Figure 2:
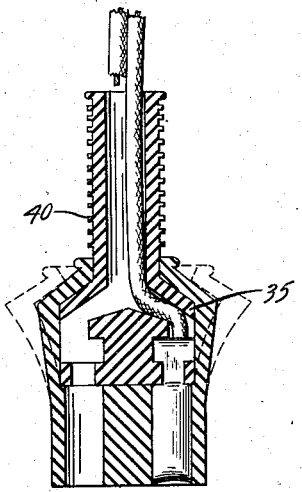
Fig. 2 is a vertical section of the same.
Figure 5:
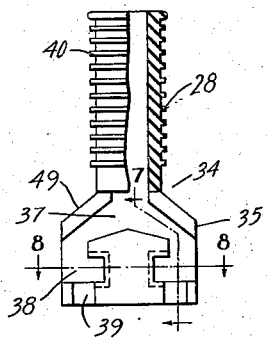
Fig. 5 is a sectional view of the auxiliary portion.
Figure 6:
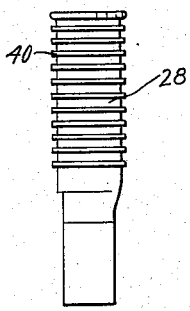
Fig. 6 is a side elevation of the same.
Figure 7:
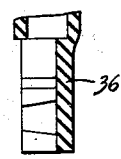
Fig. 7 is a detailed sectional view of the blade receiving portion of said auxiliary portion.

Referring to Figs. 2 and 5, the auxiliary portion 34 is also molded out of soft rubber, but preferably more rigid and harder than the rubber used in the main body portion 26. The stiffness of the auxiliary portion may be varied to suit different requirements but a preferred durometer reading would be between 70 to 95. The auxiliary portion 34 is in one piece and is provided with the integral elongated neck portion 28 hereinbefore referred to. The lower portion 35 is shaped to set within the chamber 32 in the main body portion and is preferably slightly larger than said chamber so that it will be tightly held therein by the neck portion of the main body portion and the inherent resiliency thereof. The lower portion 35 is provided with a solid back portion 36 and a cut-out front, as in Fig. 5, forming diverging channels 37 extending from the base of the elongated neck 28. The diverging channels 37 each lead to a rectangular cut-out portion 38 and a narrow slot portion 39 forming shoulders 40 on each side of the slot portion 39. When the auxiliary portion is placed within the main body portion, the slot openings 39 register with the central axis of the slot 31.

Figure 4:
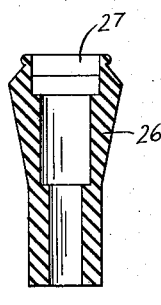
Fig. 4 is a similar view taken in a plane at right angles to Fig. 3.
Figure 9:
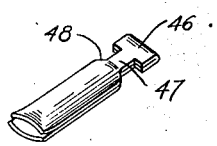
Fig. 9 is a perspective view of one type of contact blade.
Figure 8:
Fig. 8 is a sectional view taken along line 8—8 of Fig. 5.
Figure 11:
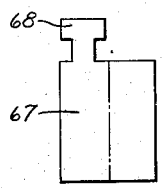
Fig. 11 is a plan view of another type of contact blade.
Figure 10:
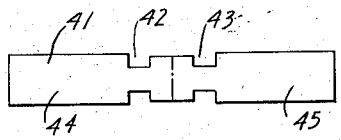
Fig. 10 is a plan view of the blank for making the same.
Figure 12:
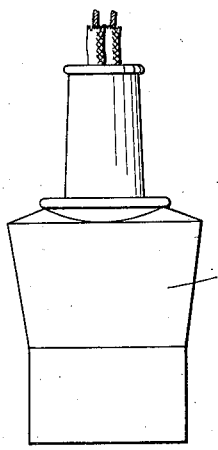
Fig. 12 is an elevation of another form of female plug embodying my invention in assembled position.

While any type of contact blade may be used, I prefer to use a type of blade shown in Figs. 9 to 11 inclusive. The type of contact blade used in this type of female plug is of the hollow type so that while inserting the prongs on the electrical appliance, the contact pins will slide within the contact blades. To this end, I provide a blank of material 41, shown in Fig. 4, the cut-outs 42 and 43 on each side of the central axis, with shoulders. When the blank 10 is bent over as in Figs. 9, and slightly arced, the two wing portions 44 and 45 will form a tube and the upper portion 46 will form a suitable anchorage or a cord lead wire which may be attached by soldering, spot-welding, etc. Between the lower portion and the upper portion 46 there will remain a narrow connecting portion 47 with shoulder cut-outs 48.

In assembly, an electrical cord lead wire 29 is first pulled through the cable neck 28 of the auxiliary portion 34. A cable neck 28 is preferably of slightly smaller diameter than the cord lead wire so that the cord lead wire may be tightly gripped therein by the resiliency of the rubber and affords a strain relief on the cord lead wire. The two strip ends of the electrical cable connection are then each soldered or spot-welded to the upper end 46 of a pair of contact blades. The contact blades are then set into the cut-out portions 38 and 39 in the auxiliary portion, the shoulders 48 interlocking with the shoulders 40 in the auxiliary portion. The auxiliary portion, while holding the contact blade and the cord lead wire, is then pulled into the main body portion 26 or any suitable means such as the machine described in my copending application, Serial No. 99,848, entitled Contact plug assembly apparatus, filed Sept. 8, 1936, in which the shoulders 33 are distended and stretched, as shown in dotted lines in Fig. 2, and the auxiliary portion pulled into the position shown in Fig. 2. When the shoulders 33 are released, they will resiliently engage the shoulders 49 on the auxiliary portion and retain it firmly in place.

The external diameter of the auxiliary portion is preferably slightly larger than the internal opening in the main body portion so that the auxiliary portion will be locked within the main body portion by the distortion and resiliency of the body portion exerting a positive force over the auxiliary portion. Furthermore, by rendering the auxiliary portion of a durometer reading of between 70 to 95, it forms a rigid form about which the main body portion, with a softer durometer reading of between 60 to 65 will pliably form itself. Thus, the inner auxiliary portion will retain its shape while the outer portion, of smaller diameter, is exerting a positive force about it. The various parts, such as the auxiliary portion, the contact blade, and the electrical cord connection, are therefore held tightly in place by the distorted stretch allowance imparted to the outer main body portion in molding.

The rigidity of the inner auxiliary portion has a further function in retaining the contact blade in proper alignment and uniformly parallel, besides forming a firmer anchor for the blade. If desired, the slot 31 may also be made of slightly smaller diameter than that of the contact blade so that the superimposed ends 44 and 45 of the contact blade will be tightly gripped together and form a firm electrical contact for the inserted contact pins.

The above construction eliminates the use of clamping means and provides a permanent firm assembly which will be unbreakable and which will not disintegrate, break, or crack when dropped or stepped upon. The use of an elongated neck portion prevents the disengagement and short-circuiting of the electrical cord inasmuch as the elongated neck portion is of smaller diameter than the electrical cord connection and relieves the normal strain on the electrical cord.

In cases where the heat of the electrical appliance makes it impossible to use the conventional type of molded soft rubber it is possible to form the construction heretofore described from a suitable molded substitute which will have the characteristics of rubber and which will withstand high temperature, or inject heat resistant ingredients in the rubber such as chlorine or powdered asbestos.

In some instances, especially in connections for electric razors and the like, it is necessary to make the above described female plug of extremely small size. In such cases I prefer to use the type of plug described in Figs. 12 to 19 inclusive.

Figure 16:
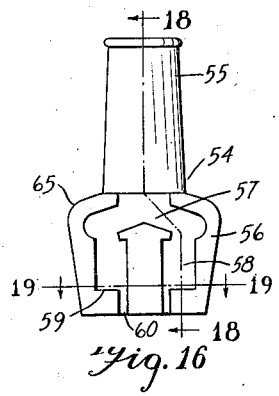
Fig. 16 is a front elevation of the auxiliary portion.
Figure 17:
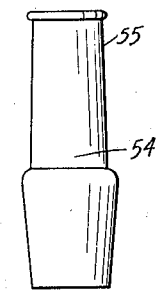
Fig. 17 is a side elevation thereof.
Figure 18:
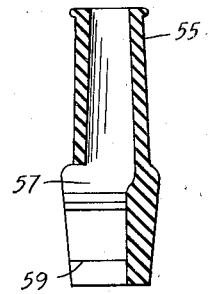
Fig. 18 is a sectional view taken along line 18—18 on Fig. 16.
Figure 19:
Fig. 19 is a sectional view taken along line 19—19 on Fig. 16.

Referring to these figures, the main plug body portion 50 is formed similarly to the plug body portion 26, with the lower portion thereof having spaced slots 51 and the upper portion with the chamber 52 and shoulders 53. The auxiliary portion 54 is also provided with an elongated neck portion 55 and a lower contact plug receiving portion 56. The portion 56 has two diverging portions 47 from the lower end of the neck 55, then two spaced longitudinal portions 58, as shown in Fig. 16, a pair of shoulders 59, one in each longitudinal portion 58, and a narrow slot portion 60.

Figure 13:
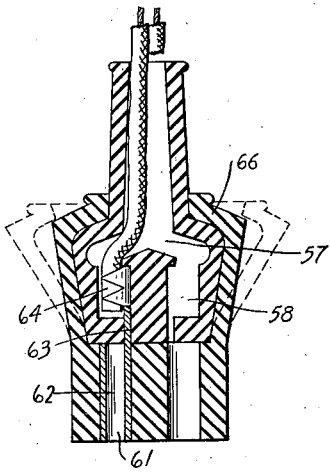
Fig. 13 is a vertical section thereof.
Figure 14:
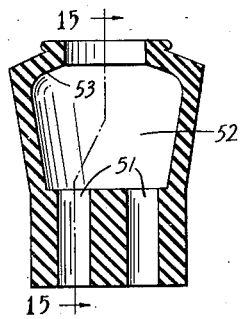
Fig. 14 is a sectional view of the main body portion thereof.
Figure 15:
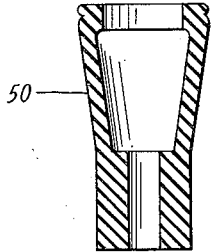
Fig. 15 is a section taken along line 15—15 on Fig. 14.
Figure 21:
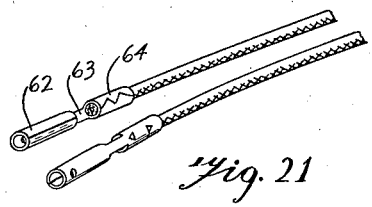
Fig. 21 is a perspective view of the contact blade in assembly with the cord lead wire.
Figure 20:
Fig. 20 is a perspective view of the blank for forming the contact blade.

In this type of construction, it is necessary to use a type of contact blade shown in Figs. 20 and 21. A blank 61 is fastened around the blank strip of each cord lead wire, as shown in Fig. 21, with the ends thereof forming a tubular portion 62, which immediate portion forming a slot portion 63 in the shape of a cut-out. The fastening end 64 is provided with teeth which pierce through the insulation of the cord lead wire so that it is unnecessary to bare the ends of the wire in assembly. This assembly is set into the auxiliary portion 54 as shown in Fig. 13, with the portions 64 of the contact blade extending into the elongated portion 58, with the cut-out 63 surrounding the abutting shoulders 59, and with the tubular portion 62 extending into the slots 51 of the main body portion.

As in the previous form, the auxiliary portion is built into the main body portion by extending the cable opening in a manner similar to the form shown in Figs. 1 to 8 inclusive. The auxiliary portion is also formed with shoulders 65 which grip firmly beneath the shoulders 66 on the main body portion and hold it in place. The durometer readings on this form are similar to the ones in the previous form, the auxiliary portion having a reading of between 70 to 95 and the main body portion a reading of between 60 to 65. The auxiliary portion is also slightly greater in diameter than the internal diameter of the main body portion so that it will be tightly held in place therein by the distortion of the main body portion.

It is obvious that the type of auxiliary portion and contact blade shown in Figs. 16 to 21 inclusive may also be used with the large type of contact plug illustrated in Figs. 1 to 8 inclusive. Furthermore, the contact blade may also be made as shown in Fig. 11 with the main body portion 67 folded over into a tube and the upper portion 68 with the cut-out shoulder and the cord receiving portion, formed of a single thickness of material. The upper portion 46 and 68 in the form of blade shown in Figs. 9 to 11 inclusive may be extended and provided with a transverse plug for further anchoring the cord lead wire thereto.

To facilitate the assembly of the aforedescribed female plug by machine, the elongated neck 28, which provides the strain relief for the electrical cord connection 29, may be made integrally with the main plug body portion 25 instead of the auxiliary portion 34. In this form, the auxiliary portion is pulled into the main plug body portion through the distended neck portion 28. To allow the passage of the auxiliary portion which holds the contact blades and cord lead wire, the neck portion 28 will necessarily be shorter. By utilizing such a construction, it is merely necessary to attach the electrical cord connection to the contact blades in any conventional manner, lay them directly into the auxiliary portion, and then complete the assembly by machine. Thus, the necessity of pulling the electrical cord connection through the neck portion is eliminated.

While I have described a specific constructional embodiment of my invention, and specific methods of assembly thereof, it is obvious that these are merely illustrative, and that changes in the size and shape of the parts, in their relative arrangement, and in the methods followed, may be made to suit the requirements for different plug designs, without departing from the spirit and the scope of the invention as defined in the appended claims.

I claim:

1. In a female type contact plug, a one-piece base of resilient material, the upper portion of said base having a recess and the lower portion of said base having two blade passageways spaced therein and extending therethrough and communicating with said recess, anchoring means nesting within said recess and locked within said recess by the resiliency of said base, contact blades locked in said anchoring means and seated in said slots, and a cable extending from said anchoring means and having leads connected to said contact blades.

2. In a female type contact plug, a one-piece base of resilient material, the upper portion of said base having a recess with lock shoulders and the low portion of said base having two blade passageways spaced therein and extending therethrough and communicating with said recess, anchoring means having cooperating lock shoulders and nesting within said recess and locked within said recess by the resiliency of said base, contact blades locked in said anchoring means and seated in said slots, and a cable extending from said anchoring means and having leads connected to said contact blades.

3. In a female type contact plug, a one-piece base of resilient material, the upper portion of said base having a recess with lock shoulders and the lower portion of said base having two blade passageways spaced therein and extending therethrough and communicating with said recess, anchoring means having cooperating lock shoulders and nesting within said recess and locked within said recess by the resiliency of said base, said anchoring means having blade recesses, contact blades locked in said recesses and seated in said slots, and a cable extending from said anchoring means and having leads connected to said contact blades.

4. In a female type contact plug, a one-piece base of resilient material, the upper portion of said base having a recess with lock shoulders and the lower portion of said base having two blade passageways spaced therein and extending therethrough and communicating with said recess, anchoring means having cooperating lock shoulders and nesting within said recess and locked within said recess by the resiliency of said base, said anchoring means having blade recesses, contact blades locked in said recesses and seated in said slots, said anchoring means having an elongated cable housing, and a cable extending from said anchoring means housing and having leads connected to said contact blades.

5. In a female type contact plug, a one-piece base of resilient material, the upper portion of said base having a recess with lock shoulders and the lower portion of said base having two blade passageways spaced therein and extending therethrough and communicating with said recess, anchoring means having cooperating lock shoulders and nesting within said recess and locked within said recess by the resiliency of said base, said anchoring means having blade recesses with shoulders, contact blades having complementary shoulders and locked in said anchoring means recesses and seated in said slots, and a cable extending from said anchoring means and having leads connected to said contact blades.

WILLIAM P. HERMAN.